(12) United States Patent
Kaufman et al.

(10) Patent No.: US 11,548,471 B2
(45) Date of Patent: Jan. 10, 2023

(54) AUTOMATED DETECTION OF SEATBELT WEBBING DAMAGE

(71) Applicant: GM Cruise Holdings LLC, San Francisco, CA (US)

(72) Inventors: Chase Kaufman, Fountain Hills, AZ (US); Jeffrey Brandon, Phoenix, AZ (US)

(73) Assignee: GM Cruise Holdings LLC, San Francisco, CA (US)

( * ) Notice: Subject to any disclaimer, the term of this patent is extended or adjusted under 35 U.S.C. 154(b) by 311 days.

(21) Appl. No.: 16/937,802

(22) Filed: Jul. 24, 2020

(65) Prior Publication Data

US 2022/0024405 A1  Jan. 27, 2022

(51) Int. Cl.
*B60R 22/12* (2006.01)
*B60R 22/48* (2006.01)

(52) U.S. Cl.
CPC .............. *B60R 22/12* (2013.01); *B60R 22/48* (2013.01); *B60R 2022/4808* (2013.01)

(58) Field of Classification Search
CPC .. B60R 22/12; B60R 22/48; B60R 2022/4808
See application file for complete search history.

(56) References Cited

U.S. PATENT DOCUMENTS

| | | | |
|---|---|---|---|
| 5,466,002 A | 11/1995 | Tanaka et al. | |
| 6,776,056 B2 | 8/2004 | Garver et al. | |
| 2007/0005202 A1* | 1/2007 | Breed | G07C 5/0808 |
| | | | 714/25 |
| 2017/0088096 A1* | 3/2017 | Luebbers | B60R 22/12 |
| 2017/0136986 A1* | 5/2017 | Beutler | B60R 22/12 |
| 2017/0282851 A1* | 10/2017 | Shimazaki | D03D 15/283 |
| 2020/0384947 A1* | 12/2020 | Wohllebe | G06Q 10/20 |

FOREIGN PATENT DOCUMENTS

| | | | |
|---|---|---|---|
| DE | 19916805 A1 * | 7/2000 | ............ B60R 22/48 |
| DE | 10133759 A1 * | 1/2003 | ....... B60R 21/01538 |
| DE | 102010002186 A1 * | 8/2011 | ............ B60R 22/12 |
| JP | 2006256553 A | 9/2006 | |

* cited by examiner

*Primary Examiner* — James A English
*Assistant Examiner* — Scott F. Underwood
(74) *Attorney, Agent, or Firm* — Akona IP PC

(57) ABSTRACT

A seatbelt system for automatically detecting damage to a seatbelt webbing includes a strip of seatbelt webbing, a sensor, and processing circuitry. The strip of seatbelt webbing includes an embedded conductive material that extends through the strip of seatbelt webbing. The sensor is connected to the seatbelt webbing and is configured to measure electrical flow through the embedded conductive material. The processing circuitry is configured to receive the measurement of electrical flow from the sensor and to generate an alert based on the measurement.

20 Claims, 4 Drawing Sheets

AUTOMATED DETECTION OF SEATBELT WEBBING DAMAGE

TECHNICAL FIELD OF THE DISCLOSURE

The present disclosure relates generally to systems and methods for automated detection of damage to seatbelt webbing material.

BACKGROUND

Seatbelts are a key component of occupant safety in vehicles. In conventional vehicles, human drivers and passengers using the seatbelts can identify damage to the seatbelts during their use of the vehicle. If a seatbelt is damaged, the driver or owner of the vehicle arranges for repair or replacement of the seatbelt.

In autonomous driving contexts, a human driver is not present within an autonomous vehicle (AV) to regularly inspect seatbelts or receive passenger feedback about seatbelts. If a seatbelt is damaged or missing, a passenger in an AV may choose a different seat, without reporting the issue to a fleet manager, leaving the fleet manager in the dark. Maintenance staff may perform routine inspections of seatbelts, e.g., on a daily or weekly basis. However, such inspections are time-consuming, and they do not immediately detect issues, such as a if a seatbelt is damaged or cut between inspections.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
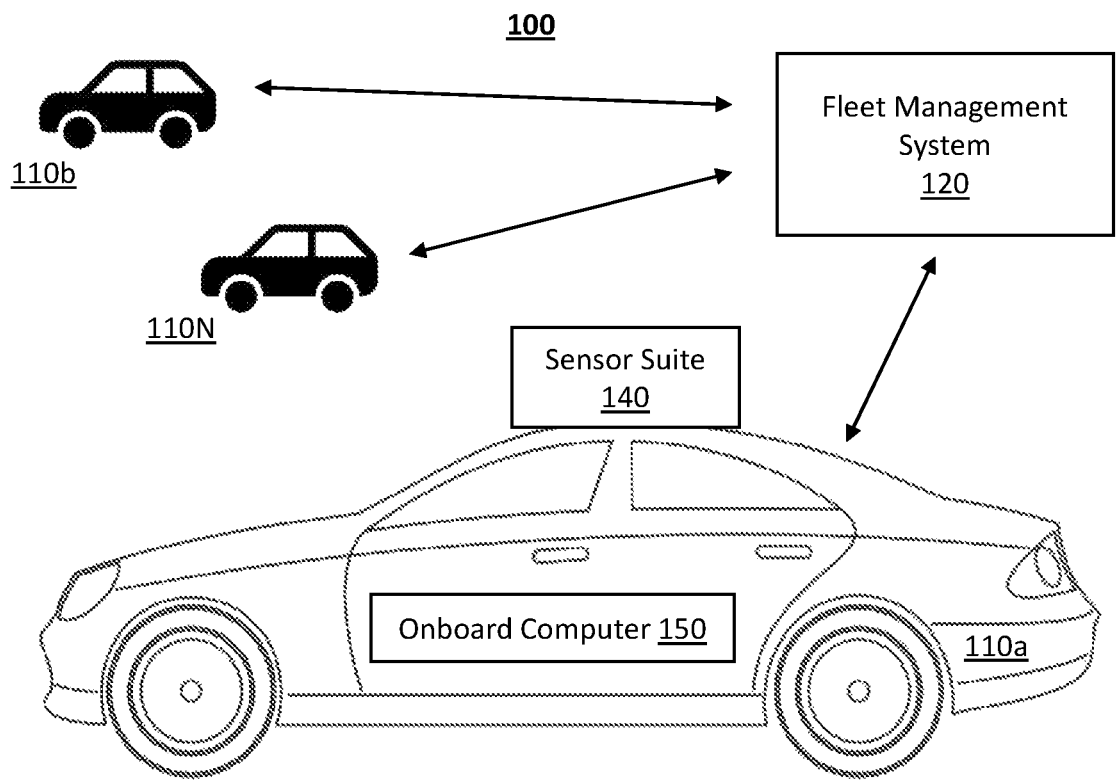
FIG. 1 is a block diagram illustrating a system including an example AV in a fleet of AVs in which a seatbelt webbing sensor system according to some embodiments of the present disclosure may be implemented.

The systems, methods and devices of this disclosure each have several innovative aspects, no single one of which is solely responsible for the all of the desirable attributes disclosed herein. Details of one or more implementations of the subject matter described in this specification are set forth in the description below and the accompanying drawings.

Manual inspection of seatbelt webbing in autonomous driving contexts has multiple drawbacks. Manual inspection is time consuming and, without a human driver or operator in the vehicle, manual inspection cannot practically be performed between each ride given by the AV. If an AV seatbelt is damaged during a ride with a first user, and the AV provides a ride to a second user before the AV returns to a facility for inspection, the second user encounters a damaged seatbelt. When encountering the damaged seatbelt, the second user may be less likely to report it than if the second user was in a vehicle with a human driver. For example, the second user may simply choose a different seat or, if the seatbelt is still usable, continue to use the damaged seatbelt; the second user may not report the damaged seatbelt through an app or in-vehicle interface.

In addition, because drivers are not present in the AVs, careless or malicious riders may be more likely to damage seatbelts than if a driver were present in the car to provide assistance and to monitor riders' behavior. Similarly, riders who bring pets that may chew or otherwise damage seatbelts may provide better oversight of their animals' behavior when a human driver is present than when the riders are traveling in AVs.

Equipping seatbelt systems to automatically detect seatbelt webbing damage overcomes these problems by sensing damage to seatbelt webbing while AVs are operating, such as during rides or between rides, without the need for manual inspections. The seatbelt webbing includes embedded conductive material, such as one or more embedded wires or conductive thread that extend through at least a portion of the seatbelt webbing. The embedded conductive material is connected to a sensor that detects electrical flow through the embedded conductive material. If the sensor detects a lower level of electrical flow than expected, this indicates that the seatbelt webbing is damaged or has been cut. For example, if the seatbelt webbing is woven with a conductive thread and the seatbelt webbing is frayed, the conductive thread is broken and the conductivity through the seatbelt webbing is lowered. As another example, if the seatbelt webbing includes one or more embedded conductive wires and a seatbelt is cut, the circuit formed from the conductive wires and the sensor is broken, which is detected by the sensor.

Processing circuitry receives a measurement of electrical flow through the embedded conductive material (e.g., a voltage or resistance measurement) from the sensor. The processing circuitry compares the measurement to an expected measurement or threshold and generates an alert in response to amount of electrical flow of the embedded conductive material being below a given threshold, e.g., a threshold indicating that the seatbelt is frayed beyond a certain amount. The AV can communicate this alert to a fleet management system, which instructs the AV to return to a maintenance facility so that the seatbelt can be repaired or replaced.

Embodiments of the present disclosure provide a seatbelt system that includes a strip of seatbelt webbing, a sensor connected to the seatbelt webbing, and processing circuitry connected to the sensor. The strip of seatbelt webbing includes an embedded conductive material extending through at least a portion of the strip of seatbelt webbing. The sensor is configured to measure electrical flow through the embedded conductive material. The processing circuitry is configured to receive the measurement of electrical flow from the sensor and to generate an alert based on the measurement.

Further embodiments of the present disclosure provide a method automatically detecting webbing damage that includes measuring electrical flow through a strip of webbing, the webbing including an embedded conductive material; comparing the measurement of electrical flow to a threshold, the threshold indicating that the strip of webbing has sustained damage; and, in response to determining that the strip of webbing has sustained damage, generating an alert.

Further embodiments of the present disclosure provide an AV comprising a plurality of passenger seats, each passenger seat having a seatbelt system that includes a strip of seatbelt webbing, a sensor connected to the seatbelt webbing, and processing circuitry connected to the sensor. The strip of seatbelt webbing includes an embedded conductive material expending through at least a portion of the strip of seatbelt webbing. The sensor is configured to measure electrical flow through the embedded conductive material. The processing circuitry is configured to receive the measurement of the electrical flow from the sensor and to generate an alert based on the measurement.

As will be appreciated by one skilled in the art, aspects of the present disclosure, in particular aspects of a seatbelt system for automated detection of webbing damage, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example System for Using Seatbelt Webbing Sensors

FIG. 1 is a block diagram illustrating a system 100 including an example autonomous vehicle (AV) in a fleet of AVs in which seatbelt webbing sensor systems according to some embodiments of the present disclosure may be implemented. The system 100 includes a fleet of AVs 110, including AV 110a, AV 110b, and AV 110N, and a fleet management system 120. For example, a fleet of AVs may include a number N of AVs, e.g., AV 110a through AV 110N. AV 110a includes a sensor suite 140 and an onboard computer 150. The onboard computer 150 interfaces with at least one seatbelt webbing sensor system to detect damage to a seatbelt in the AV 110. AVs 110b through 110N also include the sensor suite 140, onboard computer 150, and one or more seatbelt webbing sensor systems. A single AV in the fleet is referred to herein as AV 110, and the fleet of AVs is referred to collectively as AVs 110.

The fleet management system 120 receives service requests for the AVs 110 and dispatches the AVs 110 to carry out the service requests. The fleet management system 120 also oversees maintenance of the AVs 110, including maintenance of seatbelts. For example, if the seatbelt webbing detection system of AV 110*a* determines that one of the seatbelts in AV 110*a* is damaged, the AV 110*a* transmits an alert to the fleet management system 120. In response to the alert, the fleet management system 120 may take the AV 110*a* out of passenger service, schedule maintenance for the seatbelt, and instruct the AV 110*a* to drive to a maintenance facility so that the seatbelt can be repaired or replaced.

In some embodiments, each AV 110 is a fully autonomous automobile. In other embodiments, each AV 110 may additionally or alternatively be another semi-autonomous or fully autonomous vehicle; e.g., a boat, an autonomous aerial vehicle, a driverless car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle. In some embodiments, some or all of the AVs 110 are non-autonomous vehicles.

In embodiments where the AVs 110 are autonomous, each AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions; e.g., windshield wipers, headlights, turn indicators, air conditioning, etc.

The AV 110 includes a sensor suite 140, which includes a computer vision ("CV") system, localization sensors, and driving sensors. For example, the sensor suite 140 may include photodetectors, cameras, radar, sonar, lidar, GPS, wheel speed sensors, inertial measurement units (IMUs), accelerometers, microphones, strain gauges, pressure monitors, barometers, thermometers, altimeters, ambient light sensors, etc. The sensors may be located in various positions in and around the AV 110.

The onboard computer 150 is connected to the sensor suite 140 and functions to control the AV 110 and to process sensed data from the sensor suite 140 and/or other sensors in order to determine the state of the AV 110. Based upon the vehicle state and programmed instructions, the onboard computer 150 modifies or controls behavior of the AV 110. The onboard computer 150 may also include a vehicle diagnostic system that interfaces with various diagnostic sensors, including a seatbelt webbing sensor or a seatbelt webbing sensor system, within the AV 110. The onboard computer 150 is preferably a general-purpose computer adapted for I/O communication with vehicle control systems and sensor suite 140, but may additionally or alternatively be any suitable computing device. The onboard computer 150 is preferably connected to the Internet via a wireless connection (e.g., via a cellular data connection). Additionally or alternatively, the onboard computer 150 may be coupled to any number of wireless or wired communication systems.

The fleet management system 120 manages the fleet of AVs 110. The fleet management system 120 may manage a service that provides or uses the AVs 110, e.g., a service for providing rides to users with the AVs 110, or a service that delivers items, such as prepared foods, groceries, or packages, using the AVs 110. The fleet management system 120 may select an AV from the fleet of AVs 110 to perform a particular service or other task, and instruct the selected AV (e.g., AV 110*a*) to autonomously drive to a particular location (e.g., a delivery address). The fleet management system 120 also manages fleet maintenance tasks, such as charging and servicing of the AVs 110. As shown in FIG. 1, each of the AVs 110 communicates with the fleet management system 120. The AVs 110 and fleet management system 120 may connect over a public network, such as the Internet. The fleet management system 120 is described further in relation to FIG. 8.

Example Passenger Compartment

Figure 2:
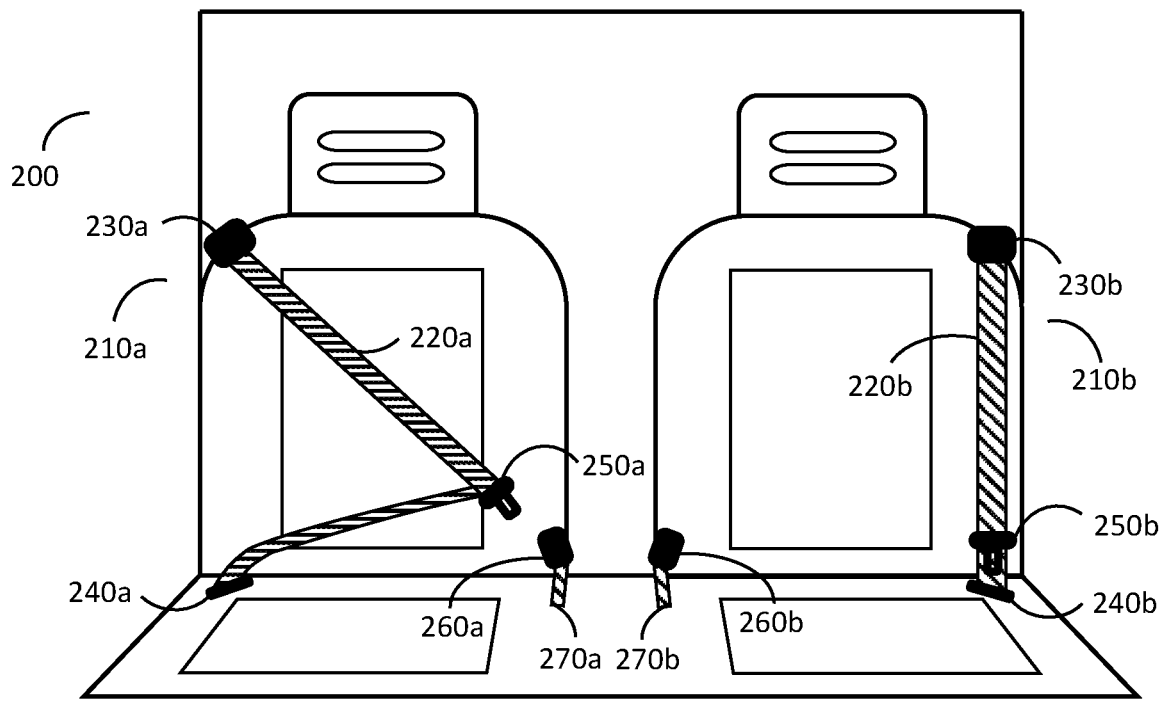
FIG. 2 illustrates a passenger compartment according to some embodiments of the present disclosure.

FIG. 2 illustrates a passenger compartment 200 of an AV 110 according to some embodiments of the present disclosure. The passenger compartment 200 includes two seats, each of which secures a passenger using a seatbelt system 210. In some embodiments, the passenger compartment 200 of the AV 110 includes two rows of seats that face each other. The view shown in FIG. 2 is from the viewpoint of one of the rows of seats, looking towards the other row of seats positioned opposite. In other embodiments, the passenger compartment 200 has other configurations, e.g., one row of seats, or two, three, or more rows of seats facing the same direction. Each row of seats may include one, two, three, or any other number of seats.

The left seat shown in FIG. 2 includes a left seatbelt system 210*a*, and the right seat includes a right seatbelt system 210*b*. The left and right seatbelt systems 210*a* and 210*b* are also referred to generally as seatbelt system 210 or collectively as seatbelt systems 210. Each seatbelt system 210 includes a strip of seatbelt webbing 220. The strip of seatbelt webbing 220 includes an embedded conductive material. For example, seatbelt webbing 220 may be woven from a conductive thread, or a conductive thread in combination with non-conductive thread. As another example, the seatbelt webbing 220 may include one or more embedded wires spanning at least a portion of the length of the strip of seatbelt webbing 220.

The seatbelt webbing 220 has two connection points: upper connection point 230 and lower connection point 240. The connection points 230 and 240 anchor the seatbelt webbing 220 to the seat. In other embodiments, one or both connection points 230 and 240 may anchor the seatbelt webbing 220 to another fixed point within the passenger compartment 200, such as a side wall or ceiling of the passenger compartment 200. The upper connection point 230 is positioned over a passenger's shoulder, and the lower connection point 240 is located next to the passenger's hip. Typically, the upper connection point 230 includes a retractor that allows the seatbelt webbing 220 to extend and retract. In FIG. 2, the left seatbelt webbing 220*a* is shown partially extended from the upper connection point 230*a*, while the right seatbelt webbing 220*b* is not extended from the upper connection point 230*b*. In other embodiments, the lower connection point 240 includes a retractor, or both connection points 230 and 240 include retractors.

The seatbelt system 210 includes a sensor connected to the seatbelt webbing 220 to measure electrical flow through the seatbelt webbing 220. For example, a sensor is included at or behind one of the connection points 230 or 240. The seatbelt system 210 further includes processing circuitry connected to the sensor; the processing circuitry may also be included at or behind one of the connection points 230 or 240, or in the onboard computer 150. The processing circuitry receives the measurement of electrical flow from the sensor. The processing circuitry may connect to the onboard computer 150 and transmit signals to the onboard computer 150 based on the received measurement. For example, the processing circuitry compares the measurement to a threshold to determine if the electrical flow measurement indicates that the seatbelt webbing 220 is damaged, and if the measurement crosses the threshold, the processing circuitry transmits an alert to the onboard computer 150. Example arrangements of the seatbelt webbing 220, sensor, and processing circuitry are shown in FIGS. 3-8.

Each seatbelt system 210 includes a buckle tongue 250 that locks into a buckle receptacle 260. The buckle receptacle 260 may be attached to the seat by another strip of seatbelt webbing 270. The seatbelt webbing 270 may include an embedded conductive material. This seatbelt webbing 270 may also be connected to a sensor and processing circuitry located at a connection point to the seat, e.g., within or underneath the seat, to sense damage to the seatbelt webbing 270. In other embodiments, the buckle receptacle 260 is anchored to the seat or to another fixed point in the passenger compartment 200 (e.g., a point between two seats) without using seatbelt webbing.

While one seatbelt configuration is shown in FIG. 2, it should be understood that the seatbelt webbing sensor system described herein may be used in other seatbelt configurations. For example, a seatbelt webbing sensor system may be included in two-point belt systems, e.g., a lap belt (i.e., a two-point seatbelt that extends over the passenger's waist) and a sash (i.e., a two-point shoulder harness that extends from a passenger's shoulder to hip). One or more seatbelt webbing sensor systems may be included in five-point belt systems, such as five-point infant and child car seats. In addition, the seatbelt webbing sensor system may be included in non-automotive passenger restraint systems, such as airplanes, buses, strollers, wheelchairs, wheelchair securement systems (e.g., on buses and trains), roller coaster restraints, etc. Furthermore, the seatbelt webbing sensor system may be used in non-passenger contexts, such as cargo straps, safety harnesses (e.g., for construction, window cleaning, recreational climbing, powerline technicians, etc.), and other contexts in which webbing material is used.

Example Seatbelt Webbing Sensor System

Figure 3:
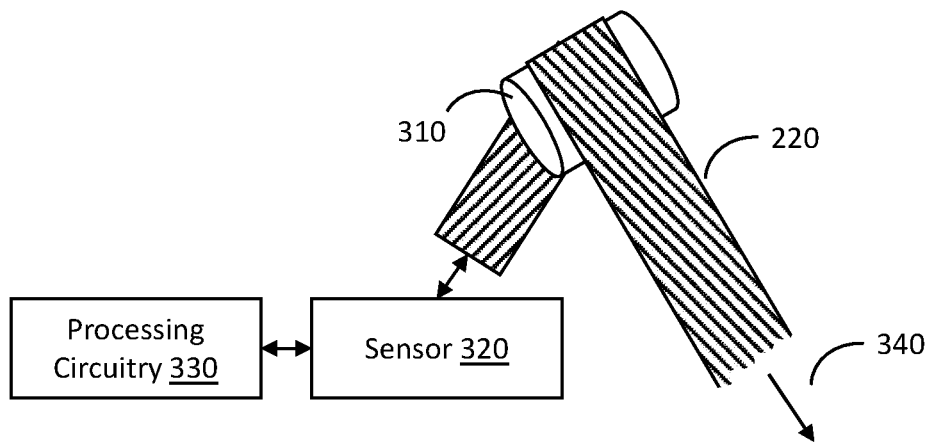
FIG. 3 illustrates a seatbelt webbing sensor system for automated detection of webbing damage according to some embodiments of the present disclosure.

FIG. 3 illustrates a seatbelt webbing sensor system for automated detection of webbing damage according to some embodiments of the present disclosure. The seatbelt webbing sensor system includes the seatbelt webbing 220, a sensor 320, and processing circuitry 330. A retractor 310 stores a portion of the seatbelt webbing 220 and allows a passenger to extend the seatbelt webbing 220 from the retractor 310 in the direction indicated by the arrow 340. In the example shown in FIG. 2, the retractor 310 allows a passenger to connect the buckle tongue 250 to the buckle receptacle 260. The retractor 310 may automatically retract excess seatbelt webbing 220. The retractor 310 may include an inertial locking mechanism that stops the seatbelt webbing 220 from extending during rapid extension, including when the AV 110 experiences rapid deceleration, e.g., during a crash or fast braking maneuver. In some embodiments, the retractor 310 includes a pretensioner and/or a web clamp.

Figure 4A:
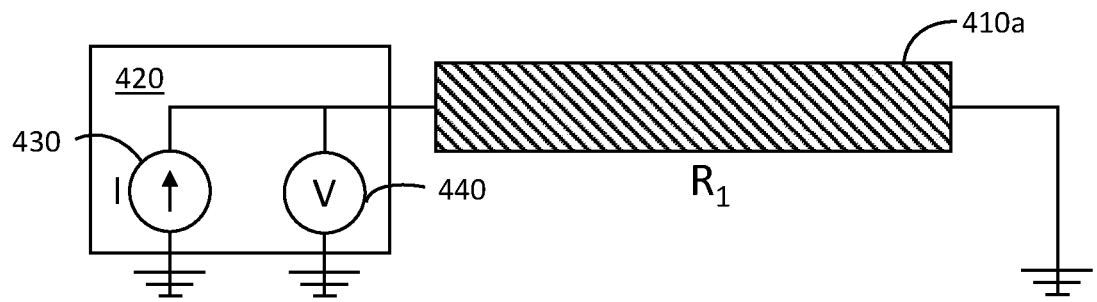
FIGS. 4A and 4B illustrate an example circuit diagram for a seatbelt webbing sensor system according to some embodiments of the present disclosure.
Figure 4B:
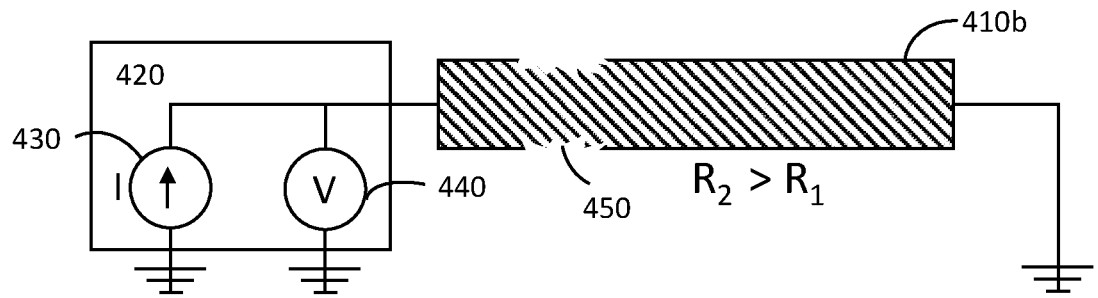
Figure 5:
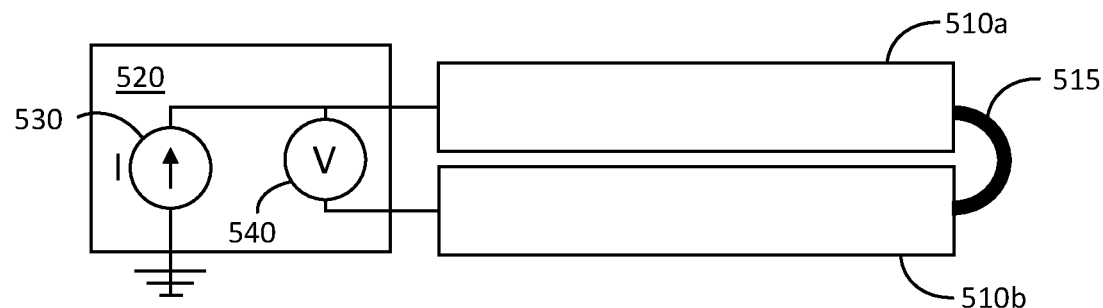
FIG. 5 illustrates an alternate diagram of a seatbelt webbing sensor system according to some embodiments of the present disclosure.

One end of the seatbelt webbing 220 extends from the retractor 310 and connects to a sensor 320. The sensor 320 is electrically coupled to the embedded conductive material of the seatbelt webbing 220. Two examples of electrical coupling are shown in FIGS. 6 and 7. The sensor 320 measures electrical flow through the embedded conductive material of the seatbelt webbing 220. In one embodiment, the sensor 320 is a voltmeter that measures voltage across the seatbelt webbing 220 or a portion of the seatbelt webbing 220. In another example, the sensor 320 is an ohmmeter that measures a resistance of the embedded conductive material of the seatbelt webbing 220. In some embodiments, the sensor 320 includes a voltage source to apply a current across the embedded conductive material of the seatbelt webbing 220, or a current source to apply a current to the embedded conductive material of the seatbelt webbing 220. In other embodiments, a voltage source or current source is separate from the sensor 320. The current applied to the conductive material may be sufficiently low to avoid harming passengers in contact with the seatbelt webbing 220, even when the seatbelt webbing 220 is cut, frayed, or otherwise damaged. In some embodiments, e.g., if a higher current is used, the current is only applied when no passengers are in the AV 110 to prevent potential injury to occupants. Various configurations may be used to measure electrical flow across the seatbelt webbing 220. Several example configurations are shown in FIGS. 4A, 4B, and 5.

The sensor 320 connects to the processing circuitry 330. The processing circuitry 330 receives the measurement of electrical flow obtained by the sensor 320. The sensor 320 and/or processing circuitry may include an analog-to-digital converter (ADC) to convert an analog measurement to a digital signal for further processing. The processing circuitry 330 compares the measurement to a threshold to determine if the measurement indicates that the seatbelt webbing 220 is damaged. If the measurement indicates that the seatbelt webbing 220 is damaged, the processing circuitry 330 generates an alert. In some embodiments, the alert includes a level of damage (e.g., whether electrical flow is reduced or cut completely). In some embodiments, the alert includes the measurement of electrical flow.

For example, if the measurement is a measured resistance of the embedded conductive material, a resistance greater than a resistance threshold indicates that the seatbelt webbing 220 has sustained damage. In another example, if the measurement is a measured voltage difference across the embedded conductive material of the seatbelt webbing 220, a voltage difference greater than a voltage threshold indicates that the seatbelt webbing 220 has sustained damage. Measurements of other electrical properties, such as current, conductivity, or power, may be used to detect seatbelt webbing damage. In general, damage to the seatbelt webbing 220 increases the resistance of the seatbelt webbing 220, and the resistance can be measured directly or indirectly in various ways.

In some embodiments, the sensor 320 and processing circuitry 330 are configured to conduct a continuity test, which involves determining if any amount of electrical current can pass through the seatbelt webbing 220. If the seatbelt webbing 220 is cut, this opens a circuit containing the seatbelt webbing 220, and the sensor 320 measures no electrical flow through the embedded conductive material of the seatbelt webbing 220.

In some embodiments, the sensor 320 and processing circuitry 330 are configured to determine a level of damage to the seatbelt webbing 220. For example, the processing circuitry 330 stores different thresholds indicating different levels of damage, e.g., one threshold indicating minor damage (e.g., the seatbelt webbing 220 is exhibiting wear but remains safe to use), a second threshold indicating major damage (e.g., a level of damage that may compromise passenger safety), and a third threshold indicating that the seatbelt has been cut completely.

In some embodiments, the processing circuitry 330 receives data describing one or more conditions which may impact the measurement of electrical flow, and adjusts the threshold for determining if the seatbelt webbing is damaged based on the received data. For example, if the ambient temperature inside the passenger compartment affects the resistance of the embedded conductive material, the processing circuitry 330 receives the ambient temperature from the onboard computer 150, and selects a threshold based on the ambient temperature.

In some embodiments, the sensor 320 and processing circuitry 330 comprise a single unit or device, e.g., a system-on-chip (SoC) or sensor system. In some embodiments, the sensor 320 and/or processing circuitry 330 are integrated with additional safety and diagnostic components. For example, the retractor 310 may include sensors and processing circuitry for diagnosing issues with the retractor mechanism, pretensioner, or other components in or relating to the retractor 310. In this example, the retractor 310, retractor diagnostic components, sensor 320, and processing circuitry 330 may form a single hardware unit.

In some embodiments, the onboard computer 150 includes the processing circuitry 330, and the sensor 320 connects to the onboard computer 150 via a wired or wireless connection. In such embodiments, the onboard computer 150 compares the measurement to one or more thresholds, and can adjust the threshold based on conditions such as ambient temperature, as described above. In other embodiments, some functions of the processing circuitry 330 described above are performed at the onboard computer 150, and other functions are performed by separate processing circuitry 330 connected to the sensor 320.

The processing circuitry 330 may connect via a wired or wireless connection to a vehicle diagnostic system, e.g., a diagnostic system implemented by the onboard computer 150 or a separate device. The vehicle diagnostic system receives signals from various diagnostic sensors within the AV 110. The vehicle diagnostic system may identify faults in various aspects of the AV 110, including the engine, brakes, steering system, sensor suite 140, etc. The vehicle diagnostic system may report any alerts received from the diagnostic sensors to the fleet management system 120. The vehicle diagnostic system may report some alerts to passengers. For example, if the vehicle diagnostic system determines that a seatbelt has an unsafe level of damage while a passenger is present in the AV 110, the vehicle diagnostic system can display alert to the passenger (e.g., on an in-vehicle display screen) to alert the passenger to the seatbelt condition, and advise the passenger to sit in a different seat.

FIG. 4A illustrates an example circuit diagram for a seatbelt webbing sensor system according to some embodiments of the present disclosure. A strip of seatbelt webbing 410a has an embedded conductive material with a resistance $R_1$. The embedded conductive material of the seatbelt webbing 410a is connected to a sensor 420. The sensor 420 includes a current source 430 and a voltmeter 440. The seatbelt webbing 410a, current source 430, and voltmeter 440 are all connected to a common ground. The current source 430 produces a current that travels across the seatbelt webbing 410a, and the voltmeter 440 measures the voltage difference across the seatbelt webbing 410a.

FIG. 4B illustrates the circuit shown in FIG. 4A after the seatbelt webbing 410a has sustained damage. The seatbelt webbing 410b shown in FIG. 4B has a frayed portion 450, which increases resistance of the embedded conductive material in the seatbelt webbing 410b; in particular, the frayed seatbelt webbing 410b has a resistance $R_2$ that is greater than the resistance $R_1$ of the undamaged seatbelt webbing 410a. The voltmeter 440 measures the voltage across the seatbelt webbing 410b. The measured voltage across the seatbelt webbing 410b is greater than the measured voltage across the seatbelt webbing 410a due to the increased resistance. Processing circuitry (e.g., processing circuitry 330) can compare the measured voltage to a threshold indicating that the seatbelt has sustained a threshold amount of damage; if the voltage is above the threshold, the processing circuitry generates an alert that the seatbelt is damaged.

FIG. 5 illustrates an alternate circuit diagram of a seatbelt webbing sensor system according to some embodiments of the present disclosure. In this example, the seatbelt webbing has two portions 510a and 510b that are connected by a connection 515. Each seatbelt webbing portion 510a and 510b includes embedded conductive material, and the embedded conductive material of the two portions 510a and 510b are coupled to the connection 515. In one example, the two portions 510a and 510b are two sides of a single strip of seatbelt webbing; the embedded conductive material extends along one side 510a, connects to the other side 510b at connection 515, and extends back towards the sensor 520 along the other side 510b. In another example, the two portions 510a and 510b form a continuous loop, e.g., a single piece of seatbelt webbing that is doubled back and returns to a single connection point (e.g., connection point 230 or 240) where the sensor 520 is located. The connection 515 may be integrated into the seatbelt webbing portions 510 rather than located outside the seatbelt webbing portions 510 as shown in the figure.

The sensor 520 includes a current source 530 and a voltmeter 540. The current source 530 produces a current that travels across the seatbelt webbing portion 510a, through the connection 515, and through the seatbelt webbing portion 510b. The voltmeter 540 measures a voltage across the seatbelt webbing portions 510a and 510b. If either or both portions of the seatbelt webbing 510a and 510b are damaged, the resistance of the embedded conductive material increases, and the measured voltage across the seatbelt webbing 510a and 510b increases. Processing circuitry (e.g., processing circuitry 330) can compare the measured voltage to a threshold indicating that the seatbelt has sustained a threshold level of damage; if the voltage is above the threshold, the processing circuitry generates an alert that the seatbelt is damaged.

In alternate embodiments, a voltage source may be used instead of a current source, and the voltage source applies a potential across a strip of seatbelt webbing, e.g., the seatbelt webbing 410 or 510. In some embodiments, a current sensor, an ohmmeter, or another sensor for measuring an electrical property of the seatbelt webbing is used instead of a voltmeter 440 or 540. In some embodiments, the voltmeter 440 or 540 is integrated into an ohmmeter that determines and outputs a resistance measurement instead of a voltage measurement.

Example Seatbelt Webbings with Embedded Conductive Material

Figure 6A:
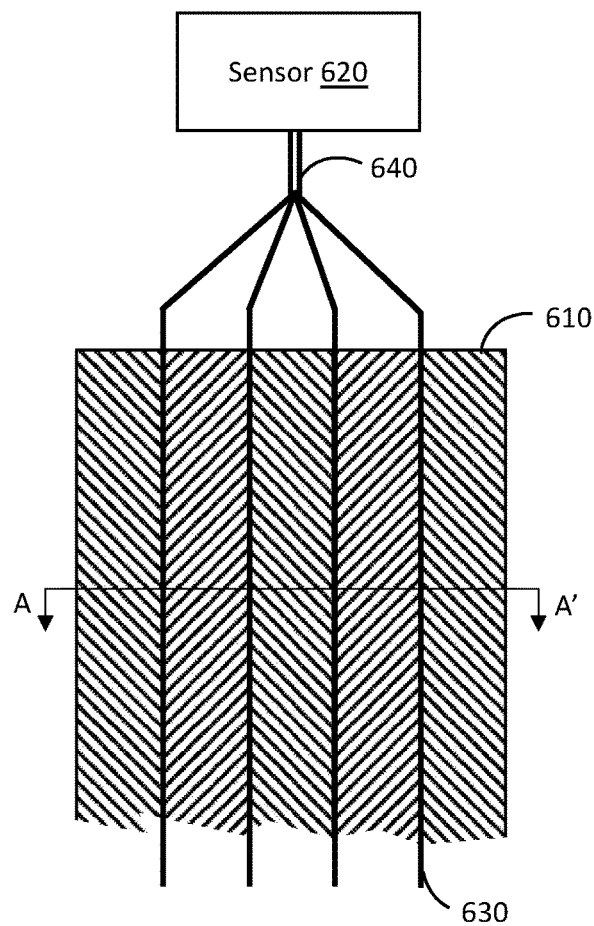
FIGS. 6A and 6B show an example arrangement of a wired seatbelt webbing connected to a sensor according to some embodiments of the present disclosure.
Figure 7:
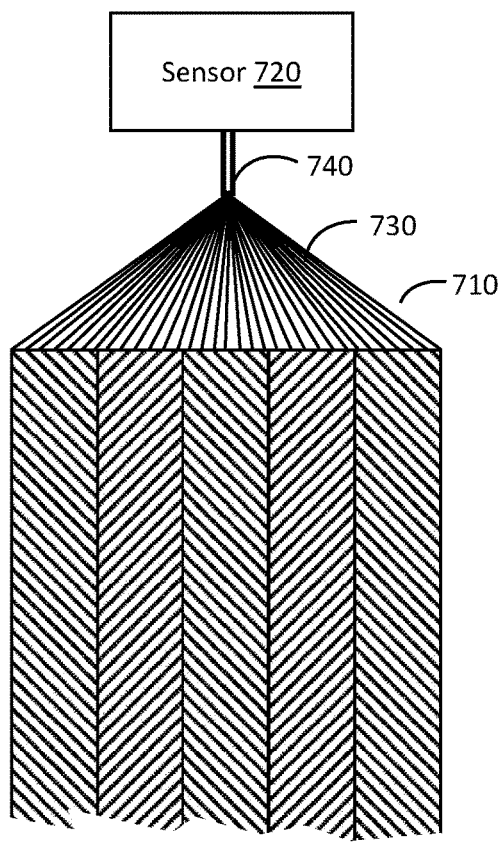
FIG. 7 shows an example arrangement of a seatbelt webbing composed of conductive thread connected to a sensor according to some embodiments of the present disclosure.
Figure 6B:

FIGS. 6A and 6B show an example arrangement of a wired seatbelt webbing connected to a sensor according to some embodiments of the present disclosure. FIG. 6A shows a portion of seatbelt webbing 610 connected to a sensor 620. The seatbelt webbing 610 is an embodiment of the seatbelt webbings 220, 410, or 510 described with respect to FIGS. 2-5, and the sensor 620 is an embodiment of the sensors 320, 420, or 520 described with respect to FIGS. 3-5. The seatbelt webbing 610 includes several embedded wires 630 that run lengthwise through the seatbelt webbing 610. The wires 630 have a thin gauge, e.g., 1 mm or less. A cross section of the seatbelt webbing 610 through A-A' is shown in FIG. 6B. In this example, the wires 630 are fully encased by the woven seatbelt material forming the seatbelt webbing 610. In other embodiments, one or more wires 630 are exposed. The wires 630 may be insulated, or the webbing material may insulate the wires. While four wires 630 are shown in FIGS. 6A and 6B, fewer or more wires may be included.

At the end of the seatbelt webbing 610 nearer to the sensor 620, the wires 630 are joined in a pigtail 640 that is connected to the sensor 620. In this example, the sensor 620 measures a collective electrical flow across all of the wires 630, e.g., between the sensor 620 and a ground, or between the end of the seatbelt webbing 610 shown in FIG. 6A and an opposite end of the seatbelt webbing 610 that returns to the sensor 620. In another embodiment, the right two wires may connect to one connector of the sensor 620 and the left two wires may connect to a different connector of the sensor 620, such that a current travels away from the sensor 620 down the right two wires and back towards the sensor 620 up the left two wires, or vice versa. In some embodiments, a seatbelt webbing sensor system includes multiple sensors 620 each connected to a different one of the wires 630, or multiple sensors 620 each connected to a subset of the wires 630.

FIG. 7 shows an example arrangement of a seatbelt webbing 710 composed of conductive thread connected to a sensor 720 according to some embodiments of the present disclosure. The seatbelt webbing 710 is an embodiment of the seatbelt webbings 220, 410, or 510 described with respect to FIGS. 2-5, and the sensor 720 is an embodiment of the sensors 320, 420, or 520 described with respect to FIGS. 3-5. The seatbelt webbing 710 is woven using conductive threads 730. The seatbelt webbing 710 may include only conductive threads 730, or a combination of conductive and non-conductive threads.

In some embodiments, the conductive threads 730 include conductive strands twisted with non-conductive fiber strands to form a conductive thread. The conductive strands may be silver, copper, nickel, tin, carbon, stainless steel, or other metallic or conductive materials. In some embodiments, the conductive strands include a combination of conductive materials. In some embodiments, the conductive threads 730 are not combined with any non-conductive fibers.

In other embodiments, the conductive threads 730 may be formed by coating or embedding a non-conductive fiber substrate with one or more electrically conductive materials, such as carbon, nickel, copper, gold, silver, titanium, or PEDOT (Poly(3,4-ethylenedioxythiophene)). The electrically conductive materials may be chemically deposited, deposited using a conductive nanoparticle ink, applied using vapor deposition, or deposited onto to the fiber substrate via another mechanism.

At the end of the seatbelt webbing 710 nearer to the sensor 720, the conductive threads 730 are joined in a pigtail 740 that is connected to the sensor 720. If a combination of conductive threads and non-conductive threads are used to weave the seatbelt webbing 710, the conductive threads 730 may separated from the non-conductive threads so that only the conductive threads are connected to the sensor 720, and the non-conductive threads are not. In this example, the sensor 720 measures a collective electrical flow across the width of the seatbelt webbing 710, e.g., between the sensor 720 and a ground, or between the end of the seatbelt webbing 710 shown in FIG. 7 and an opposite end of the seatbelt webbing 710 that returns to the sensor 720. In another embodiment, the threads that run down one portion of the seatbelt webbing 710 (e.g., a right portion) connect to one connector of the sensor 720 and the threads that run down another portion of the seatbelt webbing 710 (e.g., a left portion) connect to a different connector of the sensor 720, such that a current travels away from the sensor 720 down the right portion and back towards the sensor 720 up the left portion, or vice versa. In some embodiments, a seatbelt webbing sensor system includes multiple sensors 720 each connected to a different subset of the conductive threads 730.

Example Fleet Management System

Figure 8:
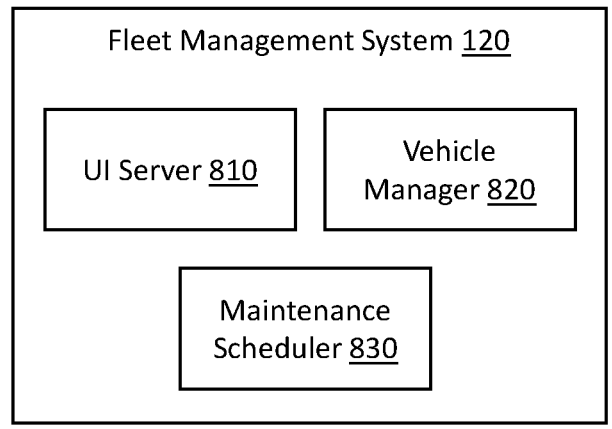
FIG. 8 is a block diagram illustrating a fleet management system according to some embodiments of the present disclosure.

FIG. 8 is a block diagram illustrating the fleet management system 120 according to some embodiments of the present disclosure. The fleet management system 120 includes a UI (user interface) server 810, a vehicle manager 820, and a maintenance scheduler 830. In alternative configurations, different and/or additional components may be included in the fleet management system 120. Further, functionality attributed to one component of the fleet management system 120 may be accomplished by a different component included in the fleet management system 120 or a different system than those illustrated.

The UI server 810 is configured to communicate with client devices that provide a user interface to users. For example, the UI server 810 may be a web server that provides a browser-based application to client devices, or the UI server 810 may be a mobile app server that interfaces with a mobile app installed on client devices. The user interface enables the user to access a service of the fleet management system 120, e.g., to request a ride from an AV 110, or to request a delivery from an AV 110.

The vehicle manager 820 manages and communicates with a fleet of AVs, including AVs 110a through 110N. The UI server 810 transmits service requests received from users to the vehicle manager 820, and the vehicle manager 820 assigns AVs 110 to the service requests. More broadly, the vehicle manager 820 directs the movements of the AVs 110 in the fleet. The vehicle manager 820 may instruct AVs 110 to drive to other locations while not servicing a user, e.g., to improve geographic distribution of the fleet, to anticipate demand at particular locations, to drive to a charging station for charging, etc. The vehicle manager 820 also instructs AVs 110 to return to AV facilities for recharging, maintenance, or storage.

The maintenance scheduler 830 schedules maintenance of the AVs 110. For example, the maintenance scheduler 830 may schedule time-based or mileage-based servicing. The maintenance scheduler 830 also schedules need-based services, including services to replace or repair damaged seatbelts. In particular, the maintenance scheduler 830 receives a signal from the AV 110 (e.g., from the onboard computer 150) indicating that one or more of the seatbelts is damaged. The maintenance scheduler 830 schedules the AV 110 for servicing and instructs the AV 110 to maneuver to a maintenance facility for servicing of the AV seatbelt. The maintenance scheduler 830 may instruct the AV 110 to drive to the maintenance facility at a particular time. The maintenance scheduler 830 may instruct the AV 110 to drive to the maintenance facility immediately, e.g., if the alert from the seatbelt webbing sensor system indicates that the seatbelt webbing is cut or has an unsafe level of damage. If the level of damage is minor, the maintenance scheduler 830 may note the damage and schedule the seatbelt for repair or replacement at a future time, e.g., during a regular servicing.

The maintenance scheduler 830 may automatically request parts to be at the maintenance facility for servicing the AV 110. For example, the maintenance scheduler 830 submits a request for the part (e.g., the seatbelt webbing and any related parts) to be delivered to the maintenance facility for servicing the AV 110. The maintenance scheduler 830 may submit the request to a parts warehouse, a parts supplier, or another source of parts.

Example Processes for Detecting Seatbelt Webbing Damage

Figure 9:
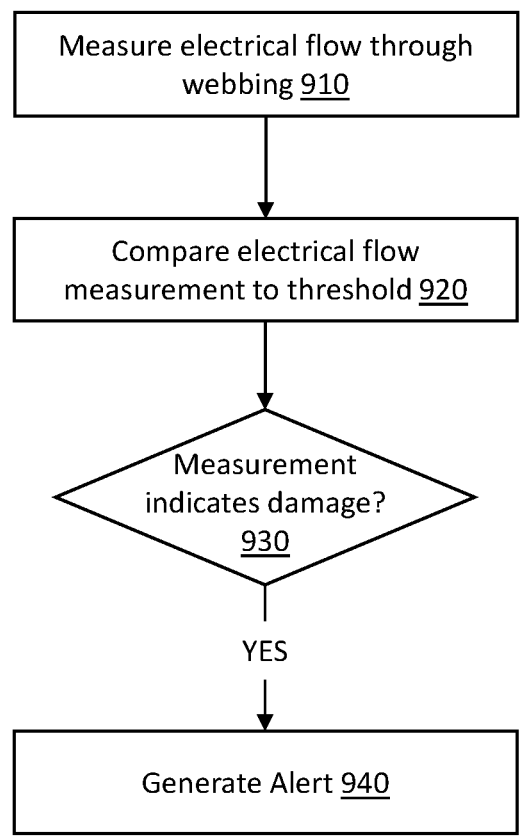
FIG. 9 is a flowchart showing a process for detecting seatbelt webbing damage according to some embodiments of the present disclosure.

FIG. 9 is a flowchart showing a process for detecting damage to seatbelt webbing according to some embodiments of the present disclosure. A sensor, e.g., any of the sensors 320, 420, 520, 620, and 720 described above, measures 910 electrical flow through the webbing. The sensor may include a voltage or current source to the webbing, and the sensor obtains a measurement of electrical flow, e.g., a voltage or a current measurement, or a resistance or conductance of the webbing.

Processing circuitry receives the measurement of electrical flow and compares 920 the measurement to a threshold amount of electrical flow. For example, the processing circuitry compares a voltage measurement to a threshold voltage, or a resistance measurement to a threshold resistance. Based on this comparison, the processing circuitry determines 930 if the measurement indicates that the webbing has sustained damage. For example, a voltage measurement greater than a threshold voltage or a resistance measurement greater than a threshold resistance indicate that the webbing has been damaged. As another example, a conductivity measurement less than a threshold conductivity indicates that the webbing has been damaged.

If the webbing has been damaged, the processing circuitry 940 generates an alert. The alert may be transmitted to a fleet management system, e.g., the fleet management system 120, or another system for handling webbing maintenance issues.

SELECT EXAMPLES

Example 1 provides a seatbelt system that includes a strip of seatbelt webbing, a sensor connected to the seatbelt webbing, and processing circuitry connected to the sensor. The strip of seatbelt webbing includes an embedded conductive material extending through at least a portion of the strip of seatbelt webbing. The sensor is configured to measure electrical flow through the embedded conductive material. The processing circuitry is configured to receive the measurement of electrical flow from the sensor and to generate an alert based on the measurement.

Example 2 provides the system according to example 1, where the embedded conductive material is a conductive thread that includes at least one conductive strand and at least one non-conductive fiber strand, and at least a portion of the seatbelt webbing is woven from the conductive thread.

Example 3 provides the system according to example 1, where the embedded conductive material is conductive thread that includes a non-conductive fiber substrate with a deposited conductive material, and at least a portion of the seatbelt webbing is woven from the conductive thread.

Example 4 provides the system according to example 1, where the embedded conductive material includes at least one wire extending through at least the portion of the strip of seatbelt webbing, and the sensor is configured to measure continuity of the at least one wire along the portion of the strip of seatbelt webbing.

Example 5 provides the system according to any of the preceding examples, where the sensor is a voltmeter configured to measure a voltage across at least a portion of the embedded conductive material, the measured voltage indicating the electrical flow through the embedded conductive material; and the processing circuitry is configured to compare the measured voltage to a threshold and generate an alert when the measured voltage is below the threshold.

Example 6 provides the system according to any examples 1 through 5, where the sensor is an ohmmeter configured to measure a resistance across at least a portion of the embedded conductive material, the measured resistance indicating the electrical flow through the embedded conductivity material; and the processing circuitry is configured to compare the measured resistance to a threshold and generate an alert when the measured resistance is below the threshold.

Example 7 provides the system according to any of the preceding examples, where the processing circuitry is configured to determine a level of damage to the seatbelt webbing based on the measurement of electrical flow, and the alert generated by the processing circuitry indicates the level of damage.

Example 8 provides the system according to any of the preceding examples, where the processing circuitry is in communication with a vehicle diagnostic system, the vehicle diagnostic system configured to relay the alert to a fleet management system.

Example 9 provides a method automatically detecting webbing damage that includes measuring electrical flow through a strip of webbing, the webbing including an embedded conductive material; comparing the measurement of electrical flow to a threshold, the threshold indicating that the strip of webbing has sustained damage; and, in response to determining that the strip of webbing has sustained damage, generating an alert.

Example 10 provides the method according to example 9, where the strip of webbing is in an AV, and the method further includes transmitting the alert to a fleet management system, the fleet management system configured to schedule AV maintenance operations; and receiving, at the AV, an instruction to the AV to drive to a repair facility for repair of the webbing.

Example 11 provides the method according to example 9 or 10, the method further including determining a level of damage to the webbing based on the measurement of electrical flow and at least one threshold level of electrical flow associated with one of a plurality of levels of damage, where the alert indicates the determined level of damage.

Example 12 provides the method according to any of examples 9 through 11, where the embedded conductive material is a conductive thread that includes at least one conductive strand and at least one non-conductive fiber strand, and at least a portion of the webbing is woven from the conductive thread.

Example 13 provides the method according to any of examples 9 through 11, where the embedded conductive material is conductive thread that includes a non-conductive fiber substrate with a deposited conductive material, and at least a portion of the webbing is woven from the conductive thread.

Example 14 provides the method according to any of examples 9 through 11, where the embedded conductive material includes at least one wire extending through the strip of webbing.

Example 15 provides the method according to any of examples 9 through 14, where measuring the electrical flow through the strip of webbing includes applying a current to the embedded conductive material, and measuring a voltage across the embedded conductive material, the measured voltage indicating the electrical flow through the embedded conductive material.

Example 16 provides the method according to any of examples 9 through 14, where measuring the electrical flow through the strip of webbing includes measuring a resistance of the embedded conductive material.

Example 17 provides an AV comprising a plurality of passenger seats, each passenger seat having a seatbelt system that includes a strip of seatbelt webbing, a sensor connected to the seatbelt webbing, and processing circuitry connected to the sensor. The strip of seatbelt webbing includes an embedded conductive material expending through at least a portion of the strip of seatbelt webbing. The sensor is configured to measure electrical flow through the embedded conductive material. The processing circuitry is configured to receive the measurement of the electrical flow from the sensor and to generate an alert based on the measurement.

Example 18 provides the AV according to example 17, where the embedded conductive material is a conductive thread, the conductive thread including a non-conductive fiber strand combined with a conductive material, and at least a portion of the seatbelt webbing is woven from the conductive thread.

Example 19 provides the AV according to example 17, where the embedded conductive material includes at least one wire extending through at least the portion of the strip of seatbelt webbing, and the sensor is configured to measure continuity of the at least one wire along the portion of the strip of seatbelt webbing.

Example 20 provides the AV according to any of examples 17 through 19, where the AV further includes an onboard computer configured to transmit the alert to a fleet management system, the fleet management system configured to schedule AV maintenance operations; receive an instruction from the fleet management system to drive to a repair facility for repair of the seatbelt webbing; and autonomously maneuver the AV to the repair facility.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A seatbelt system comprising:
   a strip of seatbelt webbing comprising an embedded conductive material extending through at least a portion of the strip of seatbelt webbing;
   a sensor connected to the seatbelt webbing, the sensor configured to measure electrical flow through the embedded conductive material; and
   processing circuitry connected to the sensor, the processing circuitry configured to:
      receive the measurement of electrical flow from the sensor;

determine a level of damage to the seatbelt webbing based on the measurement of electrical flow; and generate an alert based on the measurement, the alert indicating the level of damage.

2. The system of claim 1, wherein the embedded conductive material is a conductive thread comprising at least one conductive strand and at least one non-conductive fiber strand, and at least a portion of the seatbelt webbing is woven from the conductive thread.

3. The system of claim 1, wherein the embedded conductive material is conductive thread comprising a non-conductive fiber substrate with a deposited conductive material, and at least a portion of the seatbelt webbing is woven from the conductive thread.

4. The system of claim 1, wherein the embedded conductive material comprises at least one wire extending through at least the portion of the strip of seatbelt webbing, and the sensor is configured to measure continuity of the at least one wire along the portion of the strip of seatbelt webbing.

5. The system of claim 1, wherein the sensor is a voltmeter configured to measure a voltage across at least a portion of the embedded conductive material, the measured voltage indicating the electrical flow through the embedded conductive material, and the processing circuitry is configured to compare the measured voltage to a threshold and generate the alert when the measured voltage is below the threshold.

6. The system of claim 1, wherein the sensor is an ohmmeter configured to measure a resistance across at least a portion of the embedded conductive material, the measured resistance indicating the electrical flow through the embedded conductive material, and the processing circuitry is configured to compare the measured resistance to a threshold and generate the alert when the measured resistance is below the threshold.

7. The system of claim 1, wherein the processing circuitry is in communication with a vehicle diagnostic system, the vehicle diagnostic system configured to relay the alert to a fleet management system.

8. The system of claim 1, wherein, at a first level of damage, the alert indicates that the seatbelt is suitable for passenger use, and at a second level of damage, the alert indicates that the seatbelt is not suitable for passenger use.

9. A method for automatically detecting webbing damage comprising:

measuring electrical flow through a strip of webbing comprising an embedded conductive material;

determining a level of damage to the webbing based on the measurement of electrical flow; and in response to the determined level of damage exceeding a threshold, generating an alert, the alert indicating the determined level of damage.

10. The method of claim 9, wherein the strip of webbing is in an autonomous vehicle (AV), the method further comprising:

transmitting the alert to a fleet management system, the fleet management system configured to schedule AV maintenance operations; and receiving, at the AV, an instruction to the AV to drive to a repair facility for repair of the webbing.

11. The method of claim 9, wherein the embedded conductive material is a conductive thread comprising at least one conductive strand and at least one non-conductive fiber strand, and at least a portion of the webbing is woven from the conductive thread.

12. The method of claim 9, wherein the embedded conductive material is conductive thread comprising a non-conductive fiber substrate with a deposited conductive material, and at least a portion of the webbing is woven from the conductive thread.

13. The method of claim 9, wherein the embedded conductive material comprises at least one wire extending through the strip of webbing.

14. The method of claim 9, wherein measuring the electrical flow through the strip of webbing comprises:

applying a current to the embedded conductive material; and measuring a voltage across the embedded conductive material, the measured voltage indicating the electrical flow through the embedded conductive material.

15. The method of claim 9, wherein measuring the electrical flow through the strip of webbing comprises measuring a resistance of the embedded conductive material.

16. The method of claim 9, wherein, at a first level of damage, the alert indicates that the webbing is suitable for passenger use, and at a second level of damage, the alert indicates that the webbing is not suitable for passenger use.

17. An autonomous vehicle (AV) comprising a plurality of passenger seats, each passenger seat having a seatbelt system comprising:

a strip of seatbelt webbing comprising an embedded conductive material extending through at least a portion of the strip of seatbelt webbing;

a sensor connected to the seatbelt webbing, the sensor configured to measure electrical flow through the embedded conductive material; and processing circuitry connected to the sensor, the processing circuitry configured to:

receive the measurement of electrical flow from the sensor;

determine a level of damage to the seatbelt webbing based on the measurement of electrical flow; and generate an alert based on the measurement, the alert indicating the level of damage.

18. The AV of claim 17, wherein the embedded conductive material is a conductive thread, the conductive thread comprising a non-conductive fiber strand combined with a conductive material, and at least a portion of the seatbelt webbing is woven from the conductive thread.

19. The AV of claim 17, wherein the embedded conductive material comprises at least one wire extending through at least the portion of the strip of seatbelt webbing, and the sensor is configured to measure continuity of the at least one wire along the portion of the strip of seatbelt webbing.

20. The AV of claim 17, further comprising an onboard computer configured to:

transmit the alert to a fleet management system, the fleet management system configured to schedule AV maintenance operations;

receive an instruction from the fleet management system to drive to a repair facility for repair of the seatbelt webbing; and autonomously maneuver the AV to the repair facility.

* * * * *